US010664298B2

(12) United States Patent
Bhide et al.

(10) Patent No.: US 10,664,298 B2
(45) Date of Patent: *May 26, 2020

(54) PRESENTING HYPERVISOR DATA FOR A VIRTUAL MACHINE WITH ASSOCIATED OPERATING SYSTEM DATA

(71) Applicant: SPLUNK INC., San Francisco, CA (US)

(72) Inventors: Alok A. Bhide, Mountain View, CA (US); Adrian E. Hall, Lake Forest Park, WA (US)

(73) Assignee: SPLUNK INC., San Francisco, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/272,317

(22) Filed: Sep. 21, 2016

(65) Prior Publication Data

US 2017/0075714 A1 Mar. 16, 2017

Related U.S. Application Data

(63) Continuation of application No. 14/526,237, filed on Oct. 28, 2014, now Pat. No. 9,471,362.
(Continued)

(51) Int. Cl.
*G06F 9/455* (2018.01)
*G06F 9/46* (2006.01)
(Continued)

(52) U.S. Cl.
CPC ...... *G06F 9/45558* (2013.01); *G06F 11/3024* (2013.01); *G06F 11/3409* (2013.01);
(Continued)

(58) Field of Classification Search
CPC ............ G06F 9/45558; G06F 11/3024; G06F 11/3409; G06F 2009/45583; G06F 2009/45591
See application file for complete search history.

(56) References Cited

U.S. PATENT DOCUMENTS 8,175,863 B1 5/2012 Ostermeyer
8,176,486 B2 * 5/2012 Amir Husain .......... G06F 9/445
718/1
(Continued)

OTHER PUBLICATIONS

Ayman Issa, Visual Testing of Graphical User Interfaces: an Exploratory Study Towards Systematic Definitions and Approaches, 2012, pp. 11-15. https://ieeexplore.ieee.org/stamp/stamp.jsp?tp=&arnumber=6320526 (Year: 2012).*
(Continued)

*Primary Examiner* — Mongbao Nguyen
(74) *Attorney, Agent, or Firm* — Shook, Hardy & Bacon, L.L.P.

(57) ABSTRACT

The disclosed embodiments relate to a system for presenting data for virtual machines. During operation, the system obtains hypervisor data for a set of virtual machines, wherein the hypervisor data was received from one or more hypervisors while the set of virtual machines was running on the hypervisors. The system also obtains operating system data for the set of virtual machines, wherein the operating system data was received from a set of operating systems while the set of operating systems was running on the set of virtual machines. Next, the system correlates hypervisor data for a virtual machine with corresponding operating system data for the virtual machine. Finally, the system presents the correlated hypervisor data and operating system data for the virtual machine to a user.

20 Claims, 10 Drawing Sheets

Related U.S. Application Data

(60) Provisional application No. 62/054,264, filed on Sep. 23, 2014.

(51) Int. Cl.
*G06F 11/34* (2006.01)
*G06F 11/30* (2006.01)

(52) U.S. Cl.
CPC ........... *G06F 2009/45583* (2013.01); *G06F 2009/45591* (2013.01)

(56) References Cited

U.S. PATENT DOCUMENTS

| | | | |
|---|---|---|---|
| 8,261,268 B1 | 9/2012 | Forgette | |
| 8,364,460 B2* | 1/2013 | Ostermeyer | G06F 17/5009 703/13 |
| 8,412,696 B2 | 4/2013 | Zhang | |
| 8,458,717 B1* | 6/2013 | Keagy | G06F 8/63 718/104 |
| 8,589,403 B2 | 11/2013 | Marquardt | |
| 8,682,925 B1 | 3/2014 | Marquardt | |
| 8,751,486 B1 | 6/2014 | Neeman | |
| 8,904,389 B2 | 12/2014 | Fletcher | |
| 9,124,612 B2 | 9/2015 | Vasan | |
| 9,130,971 B2 | 9/2015 | Vasan | |
| 9,495,187 B2* | 11/2016 | Bingham | G06F 9/45533 |
| 2006/0288348 A1* | 12/2006 | Kawamoto | G06F 9/5077 718/105 |
| 2008/0028076 A1* | 1/2008 | Gupta | G06F 9/4881 709/226 |
| 2008/0222632 A1* | 9/2008 | Ueno | G06F 11/3423 718/1 |
| 2008/0295095 A1 | 11/2008 | Watanabe | |
| 2009/0007108 A1 | 1/2009 | Hanebutte | |
| 2009/0165011 A1 | 6/2009 | Kato | |
| 2009/0172666 A1* | 7/2009 | Yahalom | G06F 3/0605 718/1 |
| 2010/0082505 A1* | 4/2010 | Hollingsworth | G06F 11/328 706/11 |
| 2010/0229181 A1 | 9/2010 | Ahuja | |
| 2010/0274890 A1 | 10/2010 | Patel | |
| 2011/0107330 A1 | 5/2011 | Freundlich | |
| 2012/0096460 A1 | 4/2012 | Sekiguchi | |
| 2012/0137288 A1 | 5/2012 | Barrett | |
| 2012/0151353 A1* | 6/2012 | Joanny | G06F 3/0481 715/735 |
| 2012/0151488 A1 | 6/2012 | Arcese | |
| 2012/0173730 A1* | 7/2012 | Krumpe, Jr. | G06F 9/5072 709/226 |
| 2012/0180045 A1* | 7/2012 | Bhogal | G06F 9/50 718/1 |
| 2012/0227039 A1* | 9/2012 | Ferdman | G06F 9/5027 718/1 |
| 2012/0230223 A1 | 9/2012 | Taguchi | |
| 2012/0254860 A1 | 10/2012 | Bozek | |
| 2013/0218547 A1 | 8/2013 | Ostermeyer | |
| 2013/0239111 A1* | 9/2013 | Bingham | G06F 9/45533 718/1 |
| 2013/0275973 A1 | 10/2013 | Greenfield | |
| 2014/0025890 A1* | 1/2014 | Bert | G06F 12/0842 711/118 |
| 2014/0047440 A1 | 2/2014 | Da Silva | |
| 2014/0058871 A1* | 2/2014 | Marr | G06F 9/45533 705/26.1 |
| 2014/0059228 A1* | 2/2014 | Parikh | G06F 9/5005 709/226 |
| 2014/0137105 A1 | 5/2014 | Garg | |
| 2014/0149980 A1* | 5/2014 | Vittal | G06F 9/5072 718/1 |
| 2014/0215464 A1* | 7/2014 | Birke | G06F 9/45533 718/1 |
| 2014/0244843 A1* | 8/2014 | Cao | H04L 67/322 709/226 |
| 2014/0282514 A1* | 9/2014 | Carson | G06F 9/45533 718/1 |
| 2014/0337836 A1 | 11/2014 | Ismael | |
| 2015/0020076 A1 | 1/2015 | Zhang | |
| 2015/0026687 A1 | 1/2015 | Yim | |
| 2015/0040017 A1* | 2/2015 | Roche | G06F 11/32 715/736 |
| 2015/0052526 A1* | 2/2015 | Fujiwaka | G06F 11/3433 718/1 |
| 2015/0067143 A1 | 3/2015 | Babakhan | |
| 2015/0149611 A1* | 5/2015 | Lissack | H04L 43/0817 709/224 |
| 2015/0269053 A1* | 9/2015 | Kato | G06F 11/3428 718/105 |
| 2015/0347166 A1* | 12/2015 | Noel | G06F 11/3409 718/1 |
| 2017/0315894 A1* | 11/2017 | Babakhan | H04L 63/20 |

OTHER PUBLICATIONS

Antonio Corradi, Increasing Cloud Power Efficiency through Consolidation Techniques, 2011, pp. 129-134. https://ieeexplore.ieee.org/stamp/stamp.jsp?tp=&arnumber=5984005 (Year: 2011).*

Jungsoo Kim, Correlation-Aware Virtual Machine Allocation for Energy-Efficient Datacenters, 2013, pp. 1345-1350. https://ieeexplore.ieee.org/stamp/stamp.jsp?tp=&arnumber=6513723 (Year: 2013).*

Jia Rao, QoS Guarantees and Service Differentiation for Dynamic Cloud Applications, 2013, pp. 43-55. https://ieeexplore.ieee.org/stamp/stamp.jsp?tp=&arnumber=6298750 (Year: 2013).*

Bitincka, Ledion et al., "Optimizing Data Analysis With A Semi-Structured Time Series Database," Splunk Inc., 9 pages, 2010.

Carasso, David, "Exploring Splunk—Search Processing Lanaguage (SPL) Primer And Cookbook," 156 pages, Apr. 2012.

G, Praveen et al., "Analysis Of Performance In The Virtual Machines Environment," International Journal of Advanced Science and Technology, vol. 32, pp. 53-64, Jul. 2011.

Koh, Younggyun et al., "An Analysis Of Performance Interference Effects In Virtual Environments," International Symposium on Performance Analysis of Systems and Software, 10 pages, Apr. 25-27, 2007.

Voorsluys, William et al., "Cost Of Virtual Machine Live Migration In Clouds: A Performance Evaluation," Proceedings of the 1st International Conference on Cloud Computing, 12 pages, 2009.

Younge, Andrew J. et al., "Analysis Of Virtualization Technologies For High Performance Computing Environments," Proceedings of the 4th International Conference On Cloud Computing, 8 pages, 2011.

* cited by examiner

```
Original Search: 501
search "error | stats count BY host

Sent to peers: 502
search "error | prestats count BY host (map)

Executed by search head: 503
Merge prestats results received from peers (reduce)
```

FIG. 5

| Data Summary | | | |
|---|---|---|---|
| Hosts (5) | Sources (8) | Sourcetypes (3) | |
| filter | | | |
| Host ◊ | | Count ◊ | Last Update ◊ |
| mailsv | ⫘ ⌄ | 9,829 | 4/29/14 1:32:47.000 PM |
| vendor_sales | ⫘ ⌄ | 30,244 | 4/29/14 1:32:46.000 PM |
| www1 | ⫘ ⌄ | 24,221 | 4/29/14 1:32:44.000 PM |
| www2 | ⫘ ⌄ | 22,595 | 4/29/14 1:32:47.000 PM |
| www3 | ⫘ ⌄ | 22,975 | 4/29/14 1:32:45.000 PM |

FIG. 6B

PRESENTING HYPERVISOR DATA FOR A VIRTUAL MACHINE WITH ASSOCIATED OPERATING SYSTEM DATA

CROSS REFERENCE TO RELATED APPLICATION

This application is a continuation of and claims priority to U.S. patent application Ser. No. 14/526,237 entitled "CORRELATING HYPERVISOR DATA FOR A VIRTUAL MACHINE WITH ASSOCIATED OPERATING SYSTEM DATA" filed on Oct. 28, 2014, which claims the benefit of U.S. Provisional Application No. 62/054,264 entitled "CORRELATING HYPERVISOR DATA FOR A VIRTUAL MACHINE WITH ASSOCIATED OPERATING SYSTEM DATA" filed on Sep. 23, 2014, the disclosures of which are incorporated herein by reference in its entirety.

BACKGROUND

Field of the Invention

The disclosed embodiments generally relate to techniques for analyzing performance in computer systems. More specifically, the disclosed embodiments relate to a technique for correlating hypervisor data for a virtual machine with associated operating system data.

Related Art

Organizations are increasingly relying on cloud-based computing systems to perform large-scale computational tasks. Such cloud-based computing systems are typically operated by hosting companies that maintain a sizable computational infrastructure, often comprising thousands of servers sited in geographically distributed data centers. Customers typically buy or lease computational resources from these hosting companies. The hosting companies in turn provision computational resources according to the customers' requirements and then enable the customers to access these resources.

Cloud-based computing systems often provide a virtualized computing environment, wherein tasks run on "virtual machines" that execute on underlying physical host systems. Such virtualized computing environments enable computational tasks to be easily moved among host systems to facilitate load balancing and fault tolerance. However, they also complicate the process of diagnosing and resolving performance problems because such performance problems can arise: at the virtual-machine level; at the host-system level; and also between virtual processes that run inside the virtual machines.

Existing performance-monitoring tools for virtual machines typically operate by gathering virtual-machine performance parameters from a hypervisor, which is responsible for instantiating and executing virtual machines on an underlying host system. For example, virtual-machine performance parameters can specify processor utilization or memory utilization parameters for virtual machines that are executing on the hypervisor. However, these virtual-machine performance parameters do not tell the whole story. To determine the root cause of a performance problem, it is often advantageous to analyze performance parameters for virtual processes that run inside operating systems within the virtual machines.

Unfortunately, such virtual-process performance parameters cannot be obtained from the hypervisor. It is typically necessary for an administrator to obtain such virtual-process performance parameters from another diagnostic tool that gathers process-level performance parameters from operating systems that execute within the virtual machines. Note that these operating systems keep track of different types of performance data within the virtual machine, including performance parameters for virtual processes that run within the virtual machines. Even when such process-level performance parameters can be gathered, it is difficult to correlate these process-level performance parameters with virtual-machine performance parameters obtained from a hypervisor.

Hence, what is needed is a system that facilitates efficiently analyzing performance parameters for virtual machines together with performance parameters for associated virtual processes without the drawbacks of existing techniques.

BRIEF DESCRIPTION OF THE DRAWINGS

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

DETAILED DESCRIPTION

Figure 1:
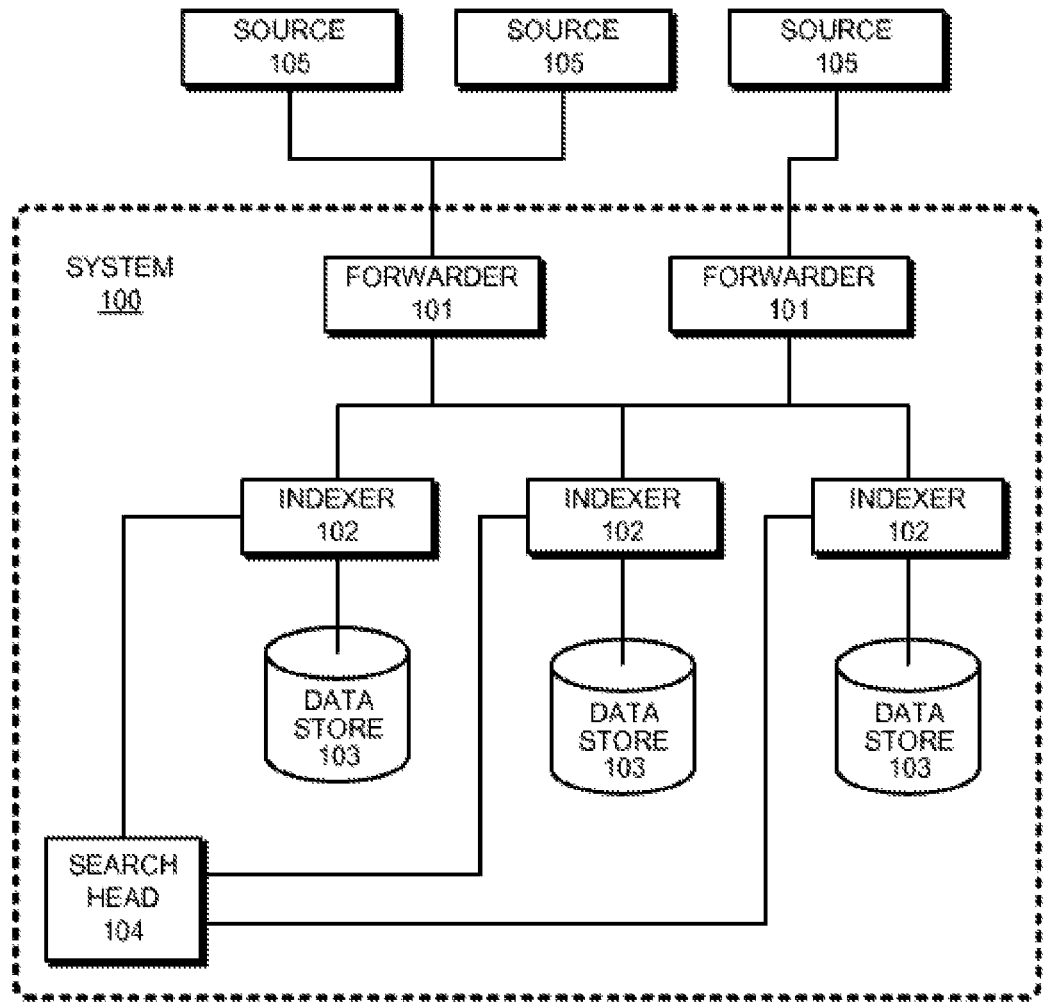
FIG. 1 presents a block diagram of an event-processing system in accordance with the disclosed embodiments.

The disclosed embodiments relate to a performance-monitoring system that facilitates correlating hypervisor performance data for virtual machines with associated operating system data for virtual processes that execute on the virtual machines. This performance-monitoring system is described in more detail below, but first we describe the structure of an event-based system in which this performance-monitoring system operates.

1.1 System Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that was selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time.

Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
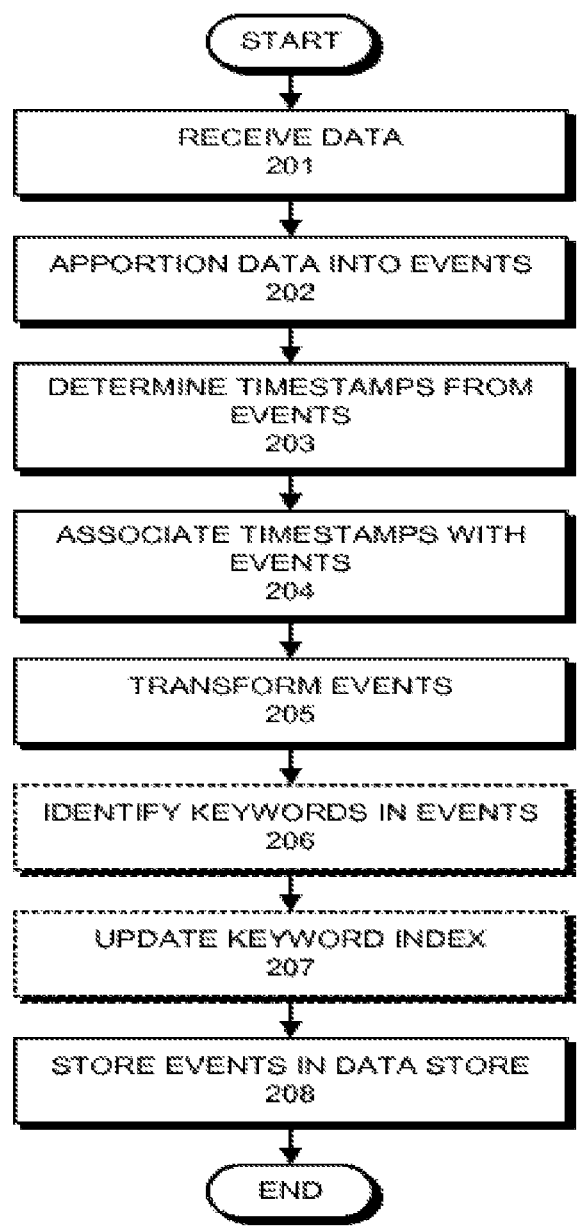
FIG. 2 presents a flow chart illustrating how indexers process, index, and store data received from forwarders in accordance with the disclosed embodiments.

FIG. 2 presents a flow chart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
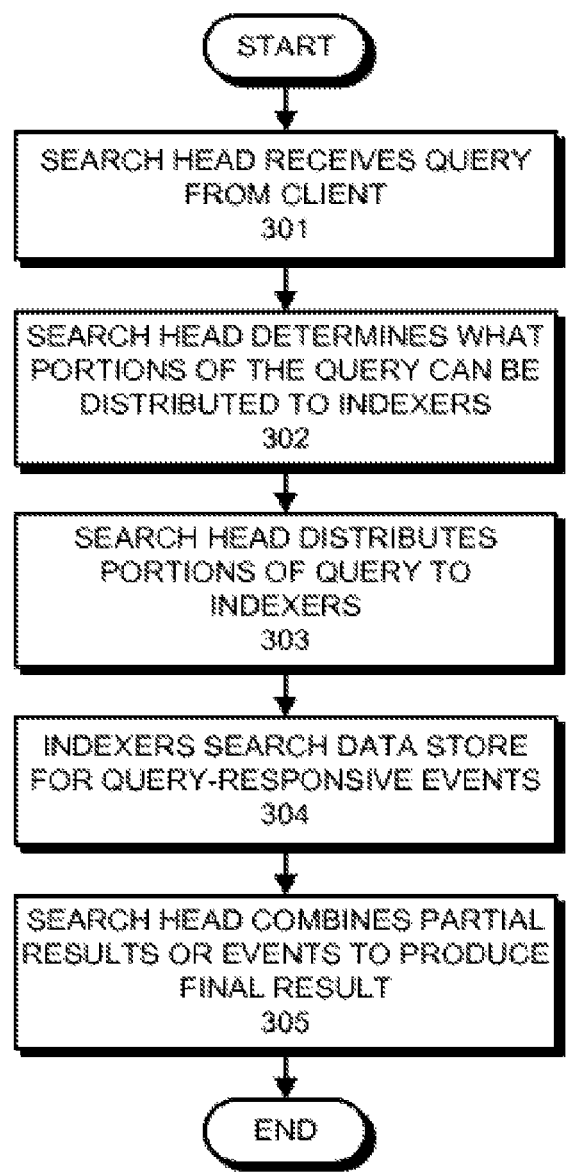
FIG. 3 presents a flow chart illustrating how a search head and indexers perform a search query in accordance with the disclosed embodiments.

FIG. 3 presents a flow chart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
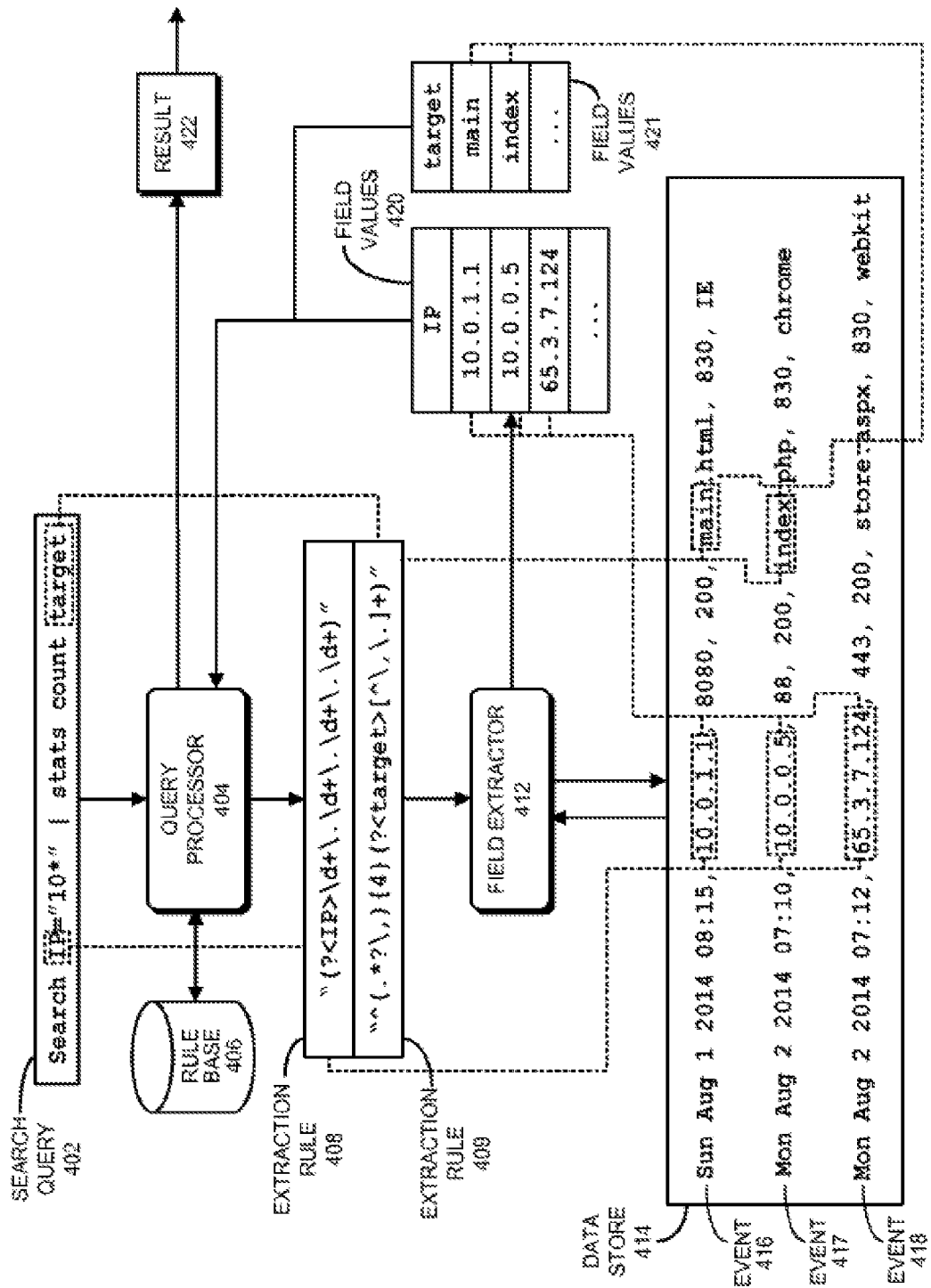
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in the Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that has been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
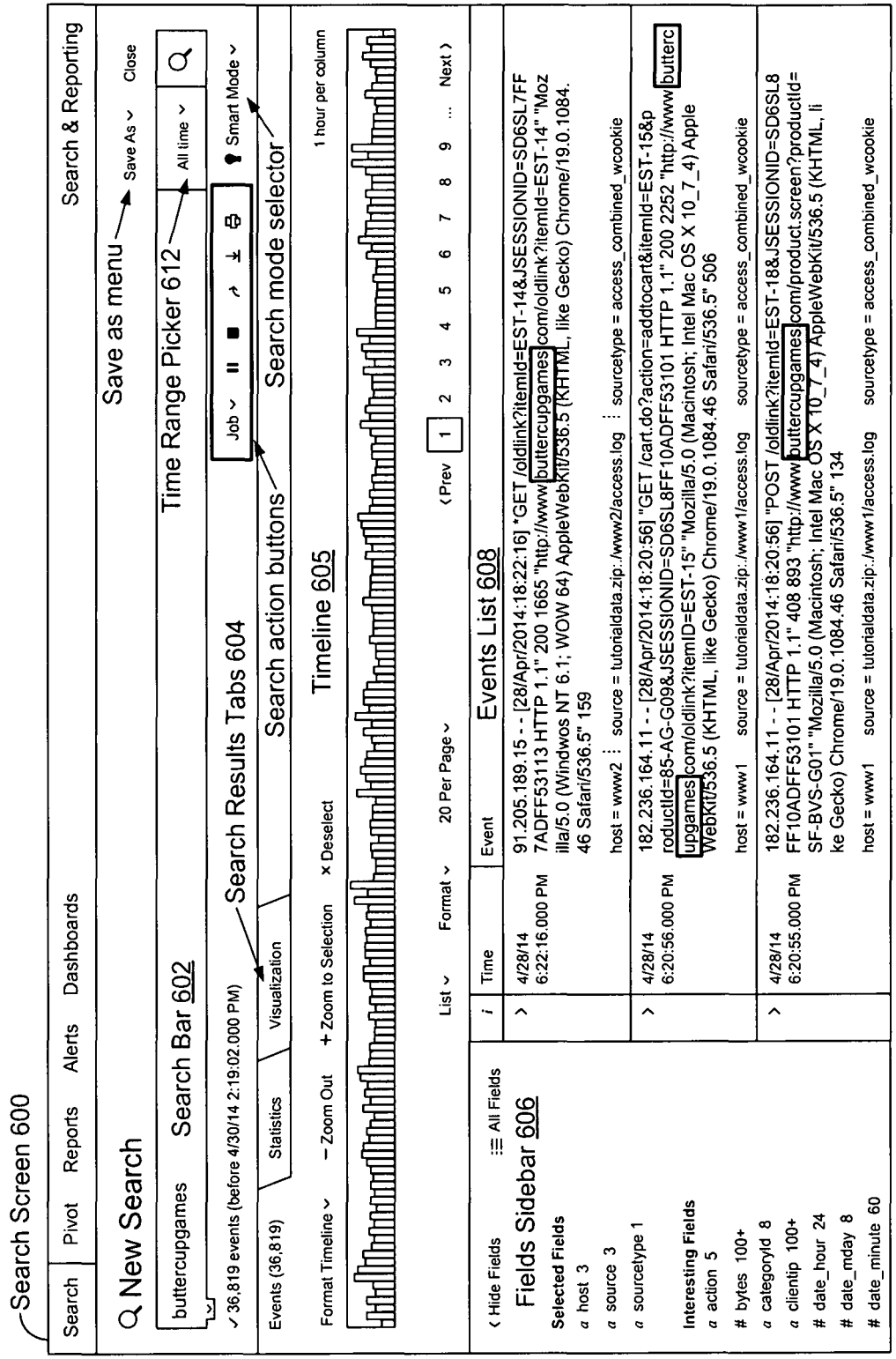
FIG. 6A illustrates a search screen in accordance with the disclosed embodiments.

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

System for Collecting Hypervisor Data and Operating System Data for a VM

Figure 7:
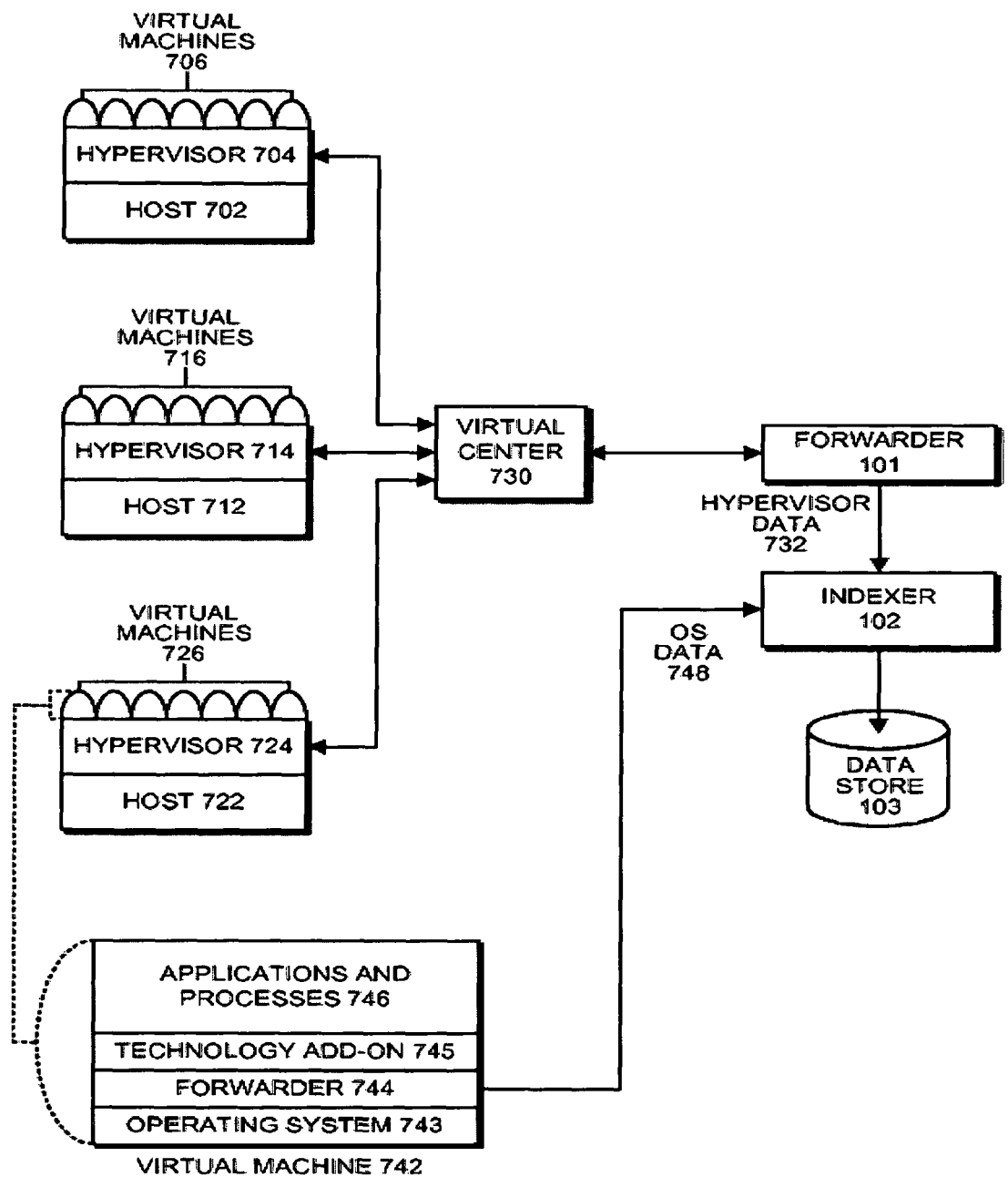
FIG. 7 illustrates how hypervisor data and associated operating system data are collected for virtual machines in accordance with the disclosed embodiments.

FIG. 7 illustrates how hypervisor data and associated operating system data are collected for a number of virtual machines in accordance with the disclosed embodiments. In particular, FIG. 7 illustrates a number of physical host systems 702, 712 and 722 containing hypervisors and associated virtual machines. Each host system 702, 712 and 722 can comprise a multi-core processor that includes a number of simultaneously executing processor cores (e.g., 64 processor cores). Moreover, each host system executes a hypervisor, which is responsible for instantiating and executing virtual machines, wherein a hypervisor allows a virtual machine to execute applications as if the virtual machine were actually a physical host machine. In particular, host system 702 executes a hypervisor 704 that executes a set of virtual machines 706, host system 712 executes a hypervisor 714 that executes a set of virtual machines 716, and host system 722 executes a hypervisor 724 that executes a set of virtual machines 726.

Note that all of these virtual machines 706, 716 and 726 and associated hypervisors 704, 714 and 724 operate under control of a management server, which is referred to as a "virtual center" 730. Virtual center 730 performs operations to facilitate centralized management, operational automation, resource optimizations and high availability for the virtual machines 706, 716 and 726, which execute on hypervisors 704, 714 and 724. Virtual center 730 additionally obtains performance-related data from hypervisors 704, 714 and 724. This performance-related data is sent to a forwarder 101, which forwards the performance-related data to an indexer 102, wherein indexer 102 stores the data in data store 103. In some embodiments, forwarder 101 obtains this performance-related data by making calls through an application programming interface (API) provided by virtual center 730.

The performance-related data obtained from hypervisors 704, 714 and 724 is referred to as "hypervisor data" 732. For example, hypervisor data 732 can include, but is not limited to: resource utilization parameters for virtual machines; resource utilization parameters for physical hosts; performance metrics for virtual machines; and performance metrics for physical hosts.

The system also obtains performance-related data from operating systems within the virtual machines. To illustrate how this performance-related data is gathered, the internal structure for a specific virtual machine 742 is illustrated in FIG. 7. The specific virtual machine 742 includes an operating system 743, which is responsible for managing the execution of various applications and processes 746. For example, operating system 743 can include the Linux™ operating system. A special forwarder 744 is installed on operating system 743 to forward performance-related data to indexer 102.

This performance-related data obtained from inside virtual machine operating systems is referred to as "operating system" (OS) data 748. For example, OS data 748 can include, but is not limited to: resource utilization parameters for virtual processes running inside the virtual machines; performance metrics for the virtual processes; identifiers for owners associated with the virtual processes; and performance data obtained from the set of operating systems and log data from operating system logs maintained by the set of operating systems. Note that this log data can include data from: underlying system logs; security logs for authentication; configuration change logs; and Internet information services (IIS) logs.

It can also be useful to know which owners are associated with specific virtual processes. For example, an owner of a process that executes inside a virtual machine is typically an administrator or a service owner. Hence, when the system determines that a standard user, who is not an administrator or a service owner, is running a process on a virtual machine, the system can determine that this circumstance is a security exception and can deal with the process accordingly.

Another piece of software, which is referred to as a technology add-on (TA) 745, is installed over special forwarder 744. TA 745 specifies how to collect OS data 748, including specifying the sources of the OS data and the frequency of collection. For example, OS data can be collected from various operating system logs, such as an event, log a security log, or an event-scheduling "cron" log. The OS data can also be collected from internal operating system kernel data structures to obtain information about the performance of specific virtual processes. TA 745 directs the collected OS data to special forwarder 744, and special forwarder 744 in turn forwards OS data 748 to indexer 102.

Correlating Hypervisor Data and OS Data for a VM

Figure 8:
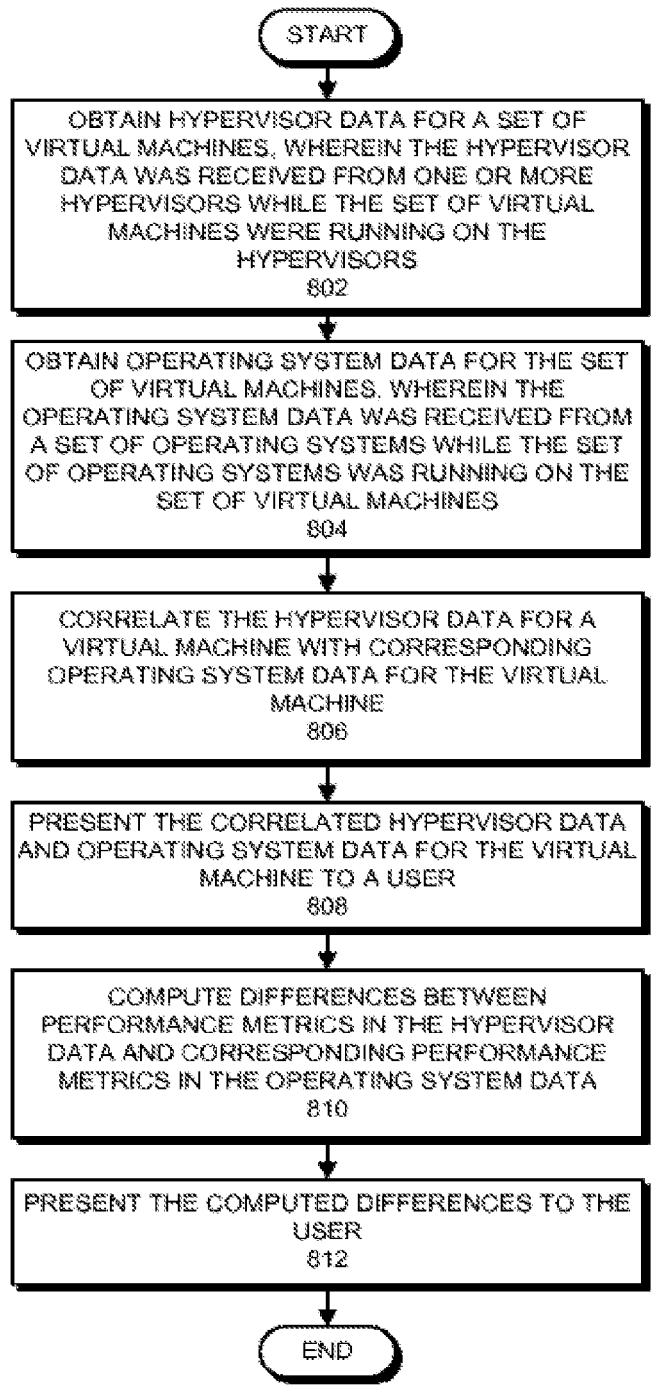
FIG. 8 presents a flow chart illustrating how hypervisor data and operating system data are processed in accordance with the disclosed embodiments.

FIG. 8 presents a flow chart illustrating how hypervisor data and operating system data are correlated for a virtual machine in accordance with the disclosed embodiments. During operation, the system obtains hypervisor data for a set of virtual machines, wherein the hypervisor data was received from one or more hypervisors while the set of virtual machines was running on the hypervisors (step 802). The system also obtains operating system data for the set of virtual machines, wherein the operating system data was received from a set of operating systems while the set of operating systems was running on the set of virtual machines (step 804).

Next, the system correlates the hypervisor data for a virtual machine with corresponding operating system data for the virtual machine (step 806). For example, the system can match hypervisor data for a virtual machine with corresponding operating system data for the same virtual machine by identifying the data with reference to a medium-access control (MAC) address associated with the virtual machine.

Note that a MAC address can serve as a unique identifier for the virtual machine. Hence, if a MAC address is stored along with the performance data by the hypervisor and also by the operating system, the MAC address can subsequently be used to identify the virtual machine that generated the performance data. This enables the system to correlate hypervisor and operating system performance data for the virtual machine. For example, suppose the system retrieves an event containing memory-utilization performance data from the hypervisor, wherein the event includes a MAC address for the virtual machine. Additionally, suppose the system retrieves another event containing memory-utilization performance data from an operating system in the same virtual machine, wherein the event also includes the MAC address for the virtual machine. In this example, the system can match the events based on the MAC address for the virtual machine, and can display the corresponding data from the hypervisor and from the operating system together in a single display for the virtual machine as is described in more detail below with reference to FIG. 9. Note that this type of correlation can be performed automatically or manually.

The system can additionally use other types of information to identify a virtual machine that generated the data, such as (1) one or more IP addresses for the virtual machine, and (2) a host name identifying a physical host on which the virtual machine executes. Also, note that to uniquely identify a host, the system can use one or more MAC addresses, plus one or more IP addresses. (Because a MAC address is unique on a network, it is also unique within a hypervisor and hence can be used for correlation.)

Next, the system presents the correlated hypervisor data and operating system data for the virtual machine to a user (step 808). For example, the system can present the hypervisor and operating system data together in a single view to enable the user to understand relationships between the hypervisor data and operating system data. In another example, the system facilitates executing a single query, which is specified in a query language, wherein the single query operates on both the hypervisor data and the operating system data for the set of virtual machines to generate a query result. In yet another example, the system can use the hypervisor data and the operating system data to establish a baseline to facilitate subsequently determining when the system undergoes a noteworthy change.

The information that is presented in this way can be quite useful. For example, the information can enable an administrator to determine whether an application is using more memory than it has been allocated, and to make a decision about whether the memory allocation needs to be increased for this application. In another example, the administrator can determine that a process is a "rogue process" that should not be running on a virtual machine, and can take steps to shut down the rogue process.

In some embodiments, the system additionally computes differences between performance metrics in the hypervisor data and corresponding performance metrics in the operating system data (step 810), and the system presents the computed differences to the user (step 812). Note that informing the user about a significant difference between a performance metric that appears in the hypervisor data and the same performance metric that appears in the operating system data makes the user aware of an uncertainty in measuring the performance metrics, and thereby enables the user to look for a cause of the discrepancy. A number of factors can cause this type of discrepancy, including the overhead involved in running the operating system on the virtual machine, and the overhead involved in running the virtual machine itself on the hypervisor.

Displaying Hypervisor Data with Operating System Data

Figure 9:
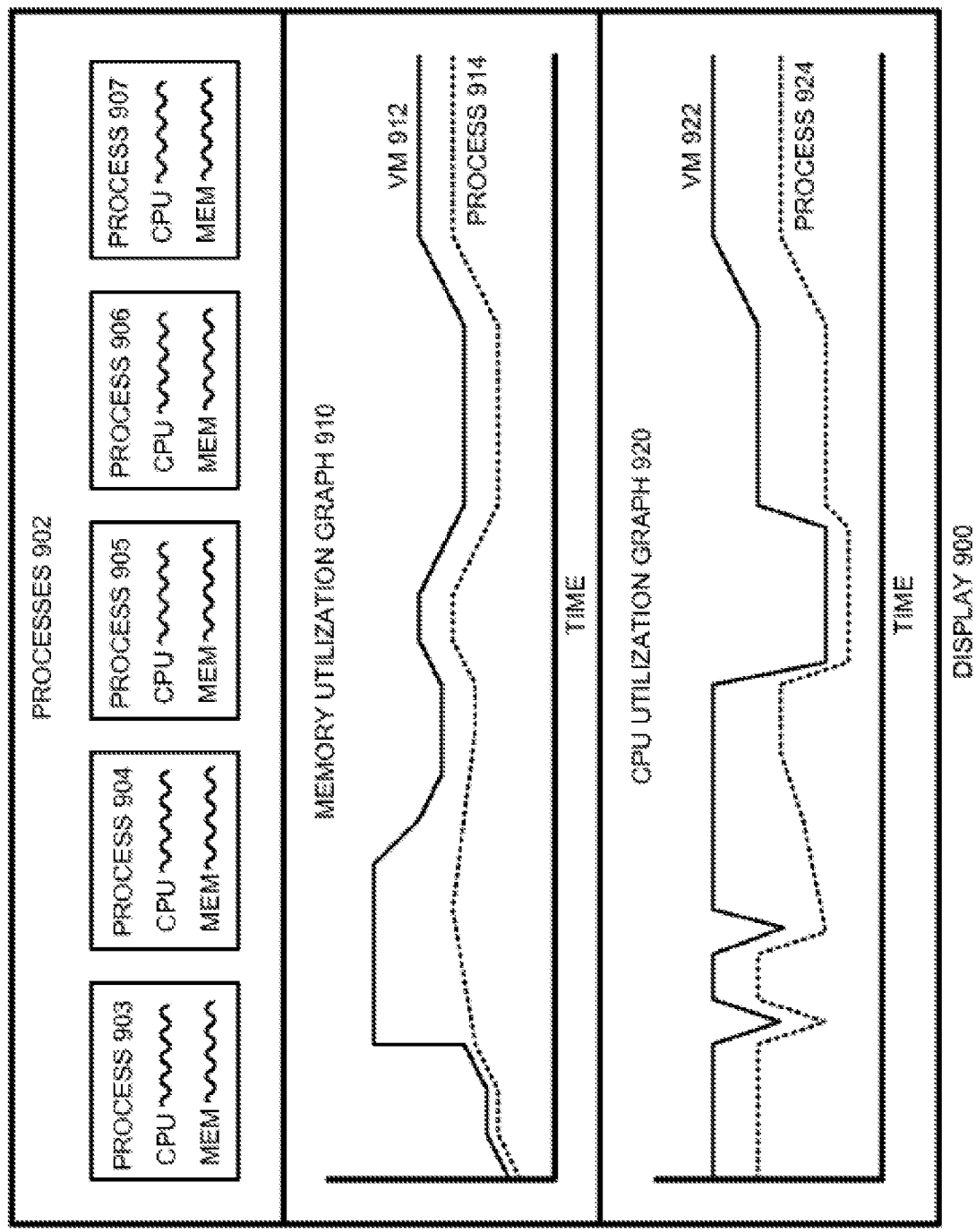
FIG. 9 presents a user interface that simultaneously displays hypervisor data and operating system data for a virtual machine in accordance with the disclosed embodiments.

FIG. 9 presents a user interface that simultaneously displays hypervisor data and operating system data for a specific virtual machine in accordance with the disclosed embodiments. More specifically, the exemplary user interface illustrated in FIG. 9 includes a display 900 that is divided into three sections. The top section 902 presents performance information for a number of virtual processes 903-907 in the virtual machine, wherein each virtual process is represented with sparklines for central processing unit utilization (labeled as "CPU") and memory utilization (labeled as "MEM"). The CPU sparkline for a virtual process represents a percentage utilization of the virtual machine's virtual CPU by the virtual process. A value of 50% indicates that the virtual process is using 50% of the virtual CPU, which means that the other virtual processes must share the remaining 50% of the virtual CPU. Similarly, the MEM sparkline for a virtual process represents a percentage utilization of the virtual machine's memory by the virtual process. It is useful for an administrator to be able to determine which specific virtual processes are consuming a significant amount of processor or memory resources.

The middle section of display 900 presents a memory utilization graph 910, which includes a solid line 912 representing memory utilization for the entire virtual machine as a percentage of the total memory that has been allocated to the virtual machine. Note that line 912 is constructed from information obtained from hypervisor data 732. Memory utilization graph 910 also includes a dashed line 914 representing memory utilization for a selected process as a percentage of the total memory that has been allocated to the virtual machine. Note that dashed line 914 is constructed from information obtained from OS data 748.

The bottom section of display 900 presents a CPU utilization graph 920, which includes a solid line 922 representing CPU utilization for the entire virtual machine as a percentage of the total CPU capacity that has been allocated to the virtual machine. This solid line 922 is constructed from information obtained from hypervisor data 732. CPU utilization graph 920 also includes a dashed line 924 representing CPU utilization for a selected process as a percentage of the total CPU capacity that has been allocated to the virtual machine. Note that dashed line 924 is constructed from information obtained from OS data 748.

When a user selects one of processes 903-907 within top section 902, the system displays the corresponding memory utilization and CPU utilization information for the selected process in the graphs that appear in the middle section 910 and bottom section 920 of display 900. This enables the user to determine, for example, whether an increase in CPU utilization for the virtual machine can be attributed to an increase in CPU utilization for a specific process. The user can also double-click on one of the processes in top section 902 to expose other types of operating-system-level information for the process.

The display illustrated in FIG. 9 is merely an example of a type of display that can be used to present both hypervisor data and operating system data for a virtual machine at the same time. In general, many different types of user interface can be used. For example, the system can provide a workflow that lets a user drill down from the perspective of the specific applications and processes into virtual machines associated with the specific applications and processes, as opposed to drilling down starting from a virtual machine hierarchy. This enables an administrator to more easily investigate the root cause of performance problems for specific applications and processes.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

What is claimed is:

1. A computer-implemented method for presenting data for virtual machines, the method comprising:
   obtaining, by a computer system, hypervisor data for a set of virtual machines, wherein the hypervisor data was received from one or more hypervisors while the set of virtual machines was running on the one or more hypervisors;
   obtaining operating system data, by the computer system, for the set of virtual machines, wherein the operating system data was received from a set of operating systems while the set of operating systems was running on the set of virtual machines;
   correlating, by the computer system, the hypervisor data for a virtual machine in the set of virtual machines with corresponding operating system data for the virtual machine by matching hypervisor data for the virtual machine with corresponding operating system data for the virtual machine by identifying the data with reference to one or more of (i) a medium-access control (MAC) address for the virtual machine, (ii) one or more IP addresses for the virtual machine, or (iii) a host name identifying a physical host on which the virtual machine executes; and
   causing, by the computer system, presentation of an output through a user-interface on a display system that includes the correlated hypervisor and operating system data for the virtual machine and identifies differences between performance metrics in the hypervisor data and corresponding performance metrics in the operating system data, indicative of performance discrepancies necessitating a change in allocation.

2. The computer-implemented method of claim 1, wherein the output includes a plurality of sections such that one of the plurality of sections presents performance information for a plurality of virtual processes in the virtual machine.

3. The computer-implemented method of claim 2, wherein each of the plurality of virtual processes is represented with a plurality of sparklines for a central processing unit utilization and a memory utilization.

4. The computer-implemented method of claim 1, wherein the output includes a plurality of sections such that one of the plurality of sections includes a graphical representation for at least one type of memory utilization related to the virtual machine.

5. The computer-implemented method of claim 4, wherein the graphical representation includes a solid line representing a memory utilization for the virtual machine as a percentage of the total memory that has been allocated to the virtual machine.

6. The computer-implemented method of claim 4, wherein the graphical representation includes a dashed line representing a memory utilization for a selected process in the virtual machine.

7. The computer-implemented method of claim 1, wherein the output includes a plurality of sections such that one of the plurality of sections presents a graphical representation for at least one type of central processing unit utilization related to the virtual machine.

8. The computer-implemented method of claim 7, wherein the graphical representation includes a solid line representing a central processing unit utilization for the virtual machine as a percentage of the total central processing unit capacity that has been allocated to the virtual machine.

9. The computer-implemented method of claim 7, wherein the graphical representation includes a dashed line representing a central processing unit utilization for a selected process in the virtual machine.

10. A non-transitory computer-readable storage medium storing instructions that when executed by a computer cause the computer to perform a method for presenting data for virtual machines, the method comprising:
  obtaining hypervisor data for a set of virtual machines at a computer system, wherein the hypervisor data was received from one or more hypervisors while the set of virtual machines was running on the one or more hypervisors;
  obtaining operating system data for the set of virtual machines at the computer system, wherein the operating system data was received from a set of operating systems while the set of operating systems was running on the set of virtual machines;
  correlating, at the computer system, the hypervisor data for a virtual machine in the set of virtual machines with corresponding operating system data for the virtual machine by matching hypervisor data for the virtual machine with corresponding operating system data for the virtual machine by identifying the data with reference to one or more of (i) a medium-access control (MAC) address for the virtual machine, (ii) one or more IP addresses for the virtual machine, or (iii) a host name identifying a physical host on which the virtual machine executes; and
  presenting an output through a user-interface on a display system that includes the correlated hypervisor and operating system data for the virtual machine and identifies differences between performance metrics in the hypervisor data and corresponding performance metrics in the operating system data, indicative of performance discrepancies necessitating a change in allocation.

11. The non-transitory computer-readable storage medium of claim 10, wherein the output includes a plurality of sections such that one of the plurality of sections presents performance information for a plurality of virtual processes in the virtual machine.

12. The non-transitory computer-readable storage medium of claim 11, wherein each of the plurality of virtual processes is represented with a plurality of sparklines for a central processing unit utilization and a memory utilization.

13. The non-transitory computer-readable storage medium of claim 10, wherein the output includes a plurality of sections such that one of the plurality of sections includes a graphical representation for at least one type of memory utilization related to the virtual machine.

14. The non-transitory computer-readable storage medium of claim 13, wherein the graphical representation includes a solid line representing a memory utilization for the virtual machine as a percentage of the total memory that has been allocated to the virtual machine.

15. The non-transitory computer-readable storage medium of claim 13, wherein the graphical representation includes a dashed line representing a memory utilization for a selected process in the virtual machine.

16. The non-transitory computer-readable storage medium of claim 10, wherein the output includes a plurality of sections such that one of the plurality of sections presents a graphical representation for at least one type of central processing unit utilization related to the virtual machine.

17. The non-transitory computer-readable storage medium of claim 16, wherein the graphical representation includes a solid line representing a central processing unit utilization for the virtual machine as a percentage of the total central processing unit capacity that has been allocated to the virtual machine.

18. The non-transitory computer-readable storage medium of claim 16, wherein the graphical representation includes a dashed line representing a central processing unit utilization for a selected process in the virtual machine.

19. A system that presents data for virtual machines, comprising:
  at least one hardware processor and at least one associated memory;
  wherein the at least one hardware processor configured to perform operations including:
  obtaining hypervisor data for a set of virtual machines at a computer system, wherein the hypervisor data was received from one or more hypervisors while the set of virtual machines was running on the one or more hypervisors;
  obtaining operating system data for the set of virtual machines at the computer system, wherein the operating system data was received from a set of operating systems while the set of operating systems was running on the set of virtual machines;
  correlating, at the computer system, the hypervisor data for a virtual machine in the set of virtual machines with corresponding operating system data for the virtual machine by matching hypervisor data for the virtual machine with corresponding operating system data for the virtual machine by identifying the data with reference to one or more of (i) a medium-access control (MAC) address for the virtual machine, (ii) one or more IP addresses for the virtual machine, or (iii) a host name identifying a physical host on which the virtual machine executes; and presenting an output through a user-interface on a display system that includes the correlated hypervisor and operating system data for the virtual machine and identifies differences between performance metrics in the hypervisor data and corresponding performance metrics in the operating system data, indicative of performance discrepancies necessitating a change in allocation.

20. The system of claim 19, wherein the output includes a plurality of sections such that one of the plurality of sections presents performance information for a plurality of virtual processes in the virtual machine.

* * * * *